United States Patent [19]

Hearn et al.

[11] Patent Number: 5,597,476
[45] Date of Patent: Jan. 28, 1997

[54] GASOLINE DESULFURIZATION PROCESS

[75] Inventors: Dennis Hearn, Pasadena; Thomas P. Hickey, Houston, both of Tex.

[73] Assignee: Chemical Research & Licensing Company, Pasadena, Tex.

[21] Appl. No.: 519,736

[22] Filed: Aug. 28, 1995

[51] Int. Cl.⁶ .................................................. C10G 53/02
[52] U.S. Cl. ................... 208/208 R; 208/209; 208/211; 208/347
[58] Field of Search ....................... 502/300; 208/208 R, 208/209, 211

[56] References Cited

U.S. PATENT DOCUMENTS

| | | | |
|---|---|---|---|
| 3,671,603 | 6/1972 | Hagemeyer et al. | 260/677 A |
| 4,055,483 | 10/1977 | Mertzweiller et al. | 208/213 |
| 4,123,502 | 10/1978 | Hölter et al. | 423/230 |
| 4,194,964 | 3/1980 | Chen et al. | 208/108 |
| 4,451,607 | 5/1984 | Garcia et al. | 524/494 |
| 4,486,297 | 12/1984 | Matsumoto et al. | 208/211 |
| 4,676,887 | 6/1987 | Fischer et al. | 208/61 |
| 4,690,806 | 9/1987 | Schorfheide | 423/230 |
| 4,827,076 | 5/1989 | Kokayeff et al. | 585/737 |
| 4,941,968 | 7/1990 | Reid | 208/236 |
| 4,990,242 | 2/1991 | Louie et al. | 208/218 |
| 5,073,236 | 12/1991 | Gelbein et al. | 203/29 |
| 5,154,817 | 10/1992 | Reid | 208/48 AA |
| 5,266,546 | 11/1993 | Hearn | 502/300 |
| 5,290,427 | 3/1994 | Fletcher et al. | 208/89 |
| 5,320,742 | 6/1994 | Fletcher et al. | 208/89 |
| 5,321,163 | 6/1994 | Hickey et al. | 568/59 |
| 5,322,615 | 6/1994 | Holtermann et al. | 208/91 |
| 5,348,641 | 9/1994 | Shih | 208/89 |
| 5,431,888 | 7/1995 | Hickey et al. | 422/191 |
| 5,431,890 | 7/1995 | Crossland et al. | 422/211 |

*Primary Examiner*—Helane Myers
*Attorney, Agent, or Firm*—Kenneth H. Johnson

[57] ABSTRACT

A catalytic cracked naphtha is desulfurized with minimum loss of olefins and octane. The naphtha is fed to a first distillation column reactor which acts as a depentanizer or dehexanizer with the lighter material containing most of the olefins and mercaptans being boiled up into a first distillation reaction zone where the mercaptans are reacted with diolefins to form sulfides which are removed in the bottoms along with any higher boiling sulfur compounds. The bottoms are subjected to hydrodesulfurization in a second distillation column reactor where the sulfur compounds are converted to $H_2S$ and removed. The lighter fraction containing most of the olefins is thus not subjected to the more harsh hydrogenation conditions of the second reactor.

13 Claims, 1 Drawing Sheet

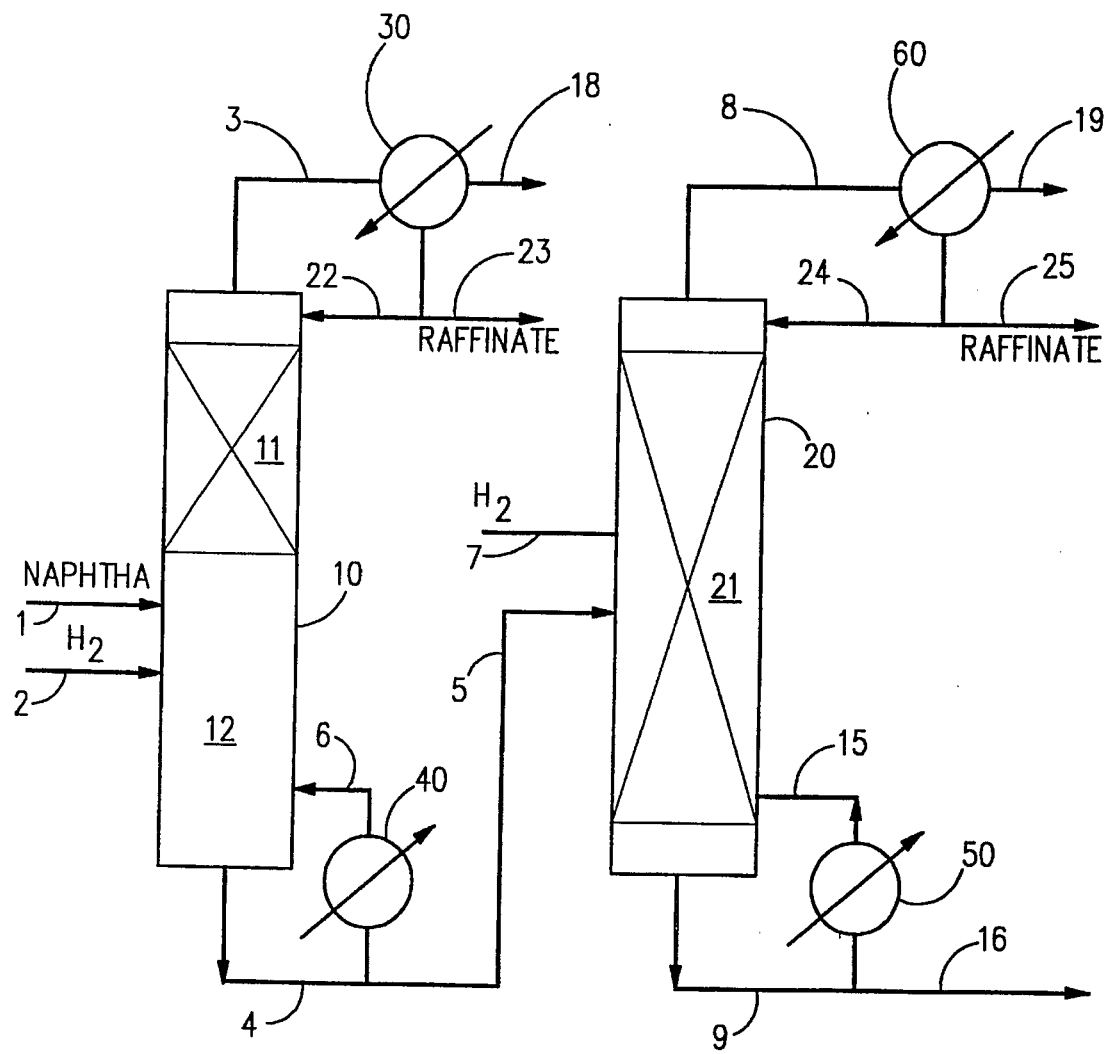

GASOLINE DESULFURIZATION PROCESS

BACKGROUND OF THE INVENTION

1. Field of the Invention

The present invention relates generally to a process for the removal of organic sulfur compounds from petroleum distillate streams. More particularly the invention involves a process to remove mercaptans, $H_2S$ and other sulfur compounds from naphtha streams, by reacting the mercaptans and $H_2S$ with diolefins in the streams to produce sulfides, which are removed along with the other sulfur compounds in a first reactive distillation column to a second reactive distillation column where the sulfur compounds are destructively hydrogenated.

2. Related Information

Petroleum distillate streams contain a variety of organic chemical components. Generally the streams are defined by their boiling ranges which determine the compositions. The processing of the streams also affects the composition. For instance, products from either catalytic cracking or thermal cracking processes contain high concentrations of olefinic materials as well as saturated (alkanes) materials and poly-unsaturated materials (diolefins). Additionally, these components may be any of the various isomers of the compounds.

Cracked naphtha as it comes from the catalytic cracker has a relatively high octane number as a result of the olefins compounds contained therein. In some cases this fraction may contribute as much as half of the gasoline in the refinery pool together with a significant portion of the octane.

Catalytically cracked naphtha (gasoline boiling range material) currently forms a major part of the gasoline product pool in the United States and it provides a large portion of the sulfur. The sulfur impurities may require removal, usually by hydrotreating, in order to comply with product specifications or to ensure compliance with environmental regulations.

The most common method of removal of the sulfur compounds is by hydrodesulfurization (HDS) in which the petroleum distillate is passed over a solid particulate catalyst comprising a hydrogenation metal supported on an alumina base. Additionally copious quantities of hydrogen are included in the feed. The following equations illustrate the reactions in a typical HDS unit:

(1) $RSH+H_2 \rightarrow RH+H_2S$ (2) $RCl+H_2 \rightarrow RH+H_Cl$ (3) $2RN+4H_2 \rightarrow RH+NH_3$ (4) $ROOH+2H_2 \rightarrow RH+H_2O$ Typical operating conditions for the HDS reactions are:

| | |
|---|---|
| Temperature, °F. | 600–780 |
| Pressure, psig | 600–3000 |
| $H_2$ recycle rate, SCF/bbl | 1500–3000 |
| Fresh $H_2$ makeup, SCF/bbl | 700–1000 |

After the hydrotreating is complete the product may be fractionated or simply flashed to release the hydrogen sulfide and collect the now sweetened naphtha. In addition to supplying high octane blending components the cracked naphthas are often used as sources of olefins in other processes such as etherifications. The conditions of hydrotreating of the naphtha fraction to remove sulfur will also saturate some of the olefinic compounds in the fraction reducing the octane and loss of source olefins.

Various proposals have been made for removing sulfur while retaining the more desirable olefins. Since the olefins in the cracked naphtha are mainly in the low boiling fraction of these naphthas and the sulfur containing impurities tend to be concentrated in the high boiling fraction the most common solution has been pre-fractionation prior to hydrotreating.

The predominant light or lower boiling sulfur compounds are mercaptans while the heavier or higher boiling compounds are thiophenes and other heterocyclic compounds. The separation by fractionation alone will not remove the mercaptans. However, in the past the mercaptans have been easily removed by oxidative processes such as Merox. A combination oxidative removal of the mercaptans followed by fractionation and hydrotreating of the heavier fraction is disclosed in U.S. Pat. No. 5,320,742. In the oxidative removal of the mercaptans the mercaptans are converted to the corresponding disulfides.

It is an advantage of the present invention that the sulfur is removed from the light olefin portion of the stream to a heavier portion of the stream without any substantial loss of olefins. All of the sulfur in the heavier portion is converted to $H_2S$ by hydrodesulfurization and easily distilled away from the hydrocarbons.

SUMMARY OF THE INVENTION

Briefly the present invention is a process for removing sulfur from a naphtha boiling range hydrocarbon stream, comprising the steps of:

(a) feeding a naphtha boiling range hydrocarbon stream containing olefins, diolefins, mercaptans and thiophenes and an effectuating amount of hydrogen to a first distillation column reactor into a feed zone;

(b) boiling a fraction of said naphtha boiling range hydrocarbon stream containing mercaptans, diolefins and a substantial portion of said olefins upward into a first distillation reaction zone containing a Group VIII metal hydrogenation catalyst prepared in the form to act as a catalytic distillation structure under conditions to react a portion of said mercaptans with a portion of the diolefins to form sulfides and an overhead distillate product having a reduced mercaptan content;

(c) removing said sulfides, thiophenes and heavier mercaptans with a higher boiling fraction as bottoms from said first distillation column reactor;

(d) feeding said bottoms and hydrogen to a second distillation column reactor having a second distillation reaction zone containing a hydrodesulfurization catalyst prepared in the form to act as a catalytic distillation structure under conditions to react a portion of said sulfides, thiophenes and heavier mercaptans with said hydrogen to form $H_2S$;

(e) removing said $H_2S$ as a gas from the overheads from said second distillation column reactor; and (f) recovering a naphtha product from said second distillation column reactor. $H_2S$ in the first reactor may react in a similar manner as the mercaptans to form sulfides with the diolefins under the same conditions.

BRIEF DESCRIPTION OF THE DRAWING

The figure is a flow diagram in schematic form of the preferred embodiment of the invention.

DETAILED DESCRIPTION OF THE PREFERRED EMBODIMENTS

Typically cracked naphtha also contains diolefins which are not desirable because of their instability in storage.

The present process preferably operates in the first distillation column reactor at overhead pressure in the range between 0 and 250 psig and temperatures within said distillation reaction zone in the range of 100° F. to 300° F., preferably 130° F. to 270° F.

The feed and the hydrogen are preferably fed to the distillation column reactor separately or they may be mixed prior to feeding. A mixed feed is fed below the catalyst bed or at the lower end of the bed. Hydrogen alone is fed below the catalyst bed and the hydrocarbon stream is fed below the bed. The pressure selected is that which maintains catalyst bed temperature between 100° F. and 300° F.

Under these conditions in the first column diolefins react with the mercaptans and $H_2S$ contained therein to form sulfides which can be separated from the lower boiling fraction containing most of the olefins. The equation of interest which describes the reaction is:

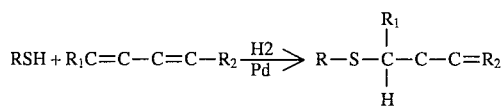

Where R, $R_1$ and $R_2$ are independently selected from hydrogen and hydrocarbyl groups of 1 to 20 carbon atoms. This may be compared to the HDS reaction of the second column which consumes hydrogen. The only hydrogen consumed in the removal of the mercaptans and/or hydrogen sulfide ($H_2S$) in the present invention is that necessary to keep the catalyst in the reduced "hydride" state. If there is concurrent hydrogenation of the dienes, then hydrogen will be consumed in that reaction.

The higher boiling fraction containing the sulfides reaction products and thiophenic and heterocyclic sulfur compounds are then hydrotreated generally at pressures in the range of 25 to less than about 300 psig and temperatures in the range of 400° F. to 700° F. to convert the organic sulfur compounds to $H_2S$ which is removed by fractionation. The $H_2S$ can be converted to elemental sulfur by conventional means known in the art.

In a first embodiment the full boiling range cracked naphtha is fed to a depentanizer which fractionates the $C_5$ and lighter boiling components from the remaining naphtha. Additionally the depentanizer contains a bed of suitable catalyst which acts as a distillation structure and also causes the diolefins within the naphtha to react with the mercaptans to form sulfides which are much higher boiling than the $C_5$ and lighter fraction. The sulfides are removed with the $C_6+$ bottoms which also contain the thiophenes and other heterocyclic sulfur compounds. The lighter $C_5$ fraction, containing the desirable olefins, is removed as overheads and contains essentially no sulfur compounds. Additionally the diolefins will also react with $H_2S$ contained in the naphtha feed to form sulfides further sweetening the $C_5$ fraction.

The $C_6+$ fraction is fed to a second distillation column reactor where hydrogen is added to react the organic sulfur compounds with the hydrogen to form $H_2S$ which can be removed by distillation. The use of a distillation column reactor which has liquid condensing within the reactor allows for much lower hydrogen partial pressure than previously used in standard hydrotreating.

Additionally the catalyst used also promotes isomerization of the olefins contained within the $C_6$ fraction which partially offsets the loss of octane due to olefin saturation.

In a second embodiment the first distillation column reactor is a dehexanizer rather than a depentanizer. The overheads will contain more of the naphtha and more of the olefin. The bottoms will still contain the sulfides, thiophenes and other heterocyclic organic sulfur compounds. The first embodiment is preferred when the overhead stream is used as a feed for tertiary amyl methyl ether (TAME) production or alkylation.

The feed to the process comprises a sulfur-containing petroleum fraction which boils in the gasoline boiling range. Feeds of this type include light naphthas having a boiling range of about $C_5$ to 330° F. and full range naphthas having a boiling range of $C_5$ to 420° F. Generally the process is useful on the naphtha boiling range material from catalytic cracker products because they contain the desired olefins and unwanted sulfur compounds. Straight run naphthas have very little olefinic material, and unless the crude source is "sour", very little sulfur.

The sulfur content of the catalytically cracked fractions will depend upon the sulfur content of the feed to the cracker as well as the boiling range of the selected fraction used as feed to the process. Lighter fractions will have lower sulfur contents than higher boiling fractions. The front end of the naphtha contains most of the high octane olefins but relatively little of the sulfur. The sulfur components in the front end are mainly mercaptans and typical of those compounds are: methyl mercaptan (b.p. 43° F.), ethyl mercaptan (b.p. 99° F.), n-propyl mercaptan (b.p. 154° F.), iso-propyl mercaptan (b.p. 135–140° F.), iso-butyl mercaptan (b.p. 190° F.), tert-butyl mercaptan (b.p. 47° F.), n-butyl mercaptan (b.p. 208° F.), sec-butyl mercaptan (b.p. 203° F.), iso-amyl mercaptan (b.p. 250° F.), n-amyl mercaptan (b.p. 259° F.), α-methylbutyl mercaptan (b.p. 234° F.), α-ethylpropyl mercaptan (b.p. 293° F.), n-hexyl mercaptan (b.p. 304° F.), 2-mercapto hexane (b.p. 284° F.), and 3-mercapto hexane (b.p. 135° F.).

Typical diolefins in the $C_5$ boiling range fraction include: isoprene (2-methyl butadiene-1,3), cis and trans piperylenes (cis and trans 1,3-pentadienes), and minor amounts of butadienes.

Typical sulfur compounds found in the heavier boiling fraction include the heavier mercaptans, thiophenes sulfides and disulfides.

Catalysts which are useful in either of the reactions utilized in the invention include the Group VIII metals. Generally the metals are deposited as the oxides on an alumina support. In the first column the catalysts are characterized as hydrogenation catalysts. The reaction of the diolefins with the sulfur compounds is selective over the reaction of hydrogen with olefinic bonds. The preferred catalysts are palladium and/or nickel or dual bed as shown in copending U.S. patent application Ser. No. 08/500,101 filed Jul. 10, 1995, which is incorporated herein by reference, since in this column the sulfur removal is carried out with the intention to preserve the olefins. Although the metals are normally deposited as oxides, other forms may be used. The nickel is believed to be in the sulfide form during the hydrogenation.

In the second column, it is the purpose to destroy the sulfur compounds to produce a hydrocarbon stream containing $H_2S$ which is easily separated from the heavier components therein. Without the concern for the olefins, and the necessity to carry out a destructive hydrogenation of the sulfides and other sulfur compounds in this column, hydrodesulfurization catalyst comprising two metal oxides supported on an alumina base, said metal oxides chosen from the group consisting of molybdenum, cobalt, nickel, tungsten and mixtures thereof are preferred. More preferably cobalt modified with nickel, molybdenum, tungsten and mixtures thereof are the preferred catalyst.

The catalysts may be supported. The supports are usually small diameter extrudates or spheres. The catalyst must then be prepared in the form of a catalytic distillation structure. The catalytic distillation structure must be able to function as catalyst and as mass transfer medium. The catalyst must be suitably supported and spaced within the column to act as a catalytic distillation structure. In a preferred embodiment the catalyst is contained in a woven wire mesh structure as disclosed in U.S. Pat. No 5,266,546, which is hereby incorporated by reference. Other catalytic distillation structures useful for this purpose are disclosed in U.S. Pat. No. 4,731,229, 5,073,236 and 5,431,890 which are also incorporated by reference.

A suitable catalyst for the reaction of the diolefins with the mercaptans is 0.4 wt % Pd on 7 to 14 mesh $Al_2O_3$ (alumina) spheres, supplied by United Catalysts Inc., designated as G-68C. Typical physical and chemical properties of the catalyst as provided by the manufacturer are as follows:

TABLE I

| Designation | G-68C |
|---|---|
| Form | Sphere |
| Nominal size | 7 × 14 mesh |
| Pd. wt % | 0.4 (0.37–0.43) |
| Support | High purity alumina |

Another catalyst useful for the mercaptan-diolefin reaction is 58 wt % Ni on 8 to 14 mesh alumina spheres, supplied by Calcicat, designated as E-475-SR. Typical physical and chemical properties of the catalyst as provided by the manufacturer are as follows:

TABLE II

| Designation | E-475-SR |
|---|---|
| Form | Spheres |
| Nominal size | 8 × 14 Mesh |
| Ni wt % | 54 |
| Support | Alumina |

The hydrogen rate to the reactor must be sufficient to maintain the reaction, but kept below that which would cause flooding of the column which is understood to be the "effectuating amount of hydrogen" as that term is used herein. Generally in the first column the mole ratio of hydrogen to diolefins and acetylenes in the feed is at least 1.0 to 1.0 and preferably 2.0 to 1.0. In the second reactor column larger quantities of hydrogen are preferably present to convert all of the sulfur compounds to $H_2S$. Based on the sulfur in the feed to the second column reactor the mole ratio of $H_2$:S is in the range of 10 to 1000:1

The catalyst also catalyzes the selective hydrogenation of the polyolefins contained within the light cracked naphtha and to a lesser degree the isomerization of some of the mono-olefins. Generally the relative rates of reaction for various compounds are in the order of from faster to slower:

(1) reaction of diolefins with mercaptans (2) hydrogenation of diolefins (3) isomerization of the mono-olefins (4) hydrogenation of the mono-olefins.

Catalysts suitable for the hyrodesulfurization reaction include cobalt-molybdenum, nickel-molybdenum and nickel-tungsten. The metals are generally present as oxides supported on a neutral base such as alumina, silica-alumina or the like. The metals are reduced to the sulfide either in use or prior to use by exposure to sulfur compound containing streams. The properties of a typical hydrodesulfurization catalyst in Table III below.

TABLE III

| Manufacture | Criterion | Criterion |
|---|---|---|
| Designation | C-448 | C-411SM3 |
| Form | Trilobe Extrudate | |
| Nominal size | 1.2 mm | 1.2 mm |
| Metal, Wt % | | |
| Cobalt | 2–5% | — |
| Molybdenum | 5–20% | 21.5% |
| Nickel | — | 3.5% |
| Support | alumina | alumina |

A typical charge to the process is a full range naphtha from a fluid catalytic cracking unit. The properties of such a naphtha is shown in Table IV below:

TABLE IV

| ASTM boiling range, °F. | 80–420 |
|---|---|
| Total Sulfur, wppm | 1000–3000 |
| Mercaptan Sulfur, wppm | 10–200 |
| Diolefins, wt % | 0.3–1.0 |
| Octane, RON/MON | 87/84 |

In the first distillation column reactor the pressure is maintained at about 0 to 250 psig with the corresponding temperature in the distillation reaction zone of between 130° F. to 270° F. Hydrogen partial pressures of 0.1 to 70 psia, more preferably 0.1 to 10 are used, with hydrogen partial pressures in the range of 0.5 to 50 psia giving optimum results.

Surprisingly, in the second column a low total pressure in the range of 25 to less than 300 psig is required for the hydrodesulfurization and hydrogen partial pressure of less than 150 psi, preferably down to 0.1 psi can be employed preferably about 15 to 50 psi. The temperature in the distillation reaction zone is between 400° F. to 750° F. Hydrogen for the second distillation column reactor is fed in the range of one to ten standard cubic feet (SCF) per pound of feed. Nominal liquid hourly space velocities (liquid volume of feed per unit volume of catalyst) in the second column are in the range of 2–5.

Referring now to the figure a flow diagram in schematic form is shown to illustrate one embodiment of the invention. The naphtha is fed to a first distillation column reactor 10 via flow line 1 and an effectuating amount of hydrogen for the diolefin/mercaptan reaction is fed via flow line 2. Distillation column reactor 10 contains distillation reaction zone 11 in the upper end which contains the supported palladium catalyst for the diolefin/mercaptan reaction. As desired the column 10 may be run to take a $C_5$ and lighter or a $C_6$ and lighter as overheads. In either case the lighter fraction containing most of the octane improving olefins and the mercaptans is boiled up into the distillation reaction zone 11. In distillation reaction zone 11 substantially all of the mercaptans react with the diolefins to form higher boiling sulfides. The lower section of the first distillation column reactor 10 acts as a stripping section to separate the $C_6$+ or $C_7$+material from the lighter components. The diolefins formed in the distillation reaction zone 11 are also separated from the lighter fraction. The $C_6$+ or $C_7$+ material, containing the sulfides and the heavier thiophene type compounds are taken from the distillation column reactor 10 as bottoms via flow line 4. A reboiler 40 and reboiler return 6 are provided for heat balance. The substantially sulfur free $C_5$ or $C_6$ and lighter fraction is taken as overheads via flow line 3 and condensed in overhead condenser 30. Product is taken via flow line 18 either to gasoline blending or further processing as desired. A reflux 22 is included for better reaction and separation. Raffinate product is taken via line 23.

The bottoms from the first distillation column reactor 10 is fed to second distillation column reactor 20 via flow line 5 and additional hydrogen for the hydrodesulfurization reaction is fed via flow line 7. The second distillation column reactor 20 contains a second distillation reaction zone 21 containing the cobalt/molybdenum catalyst for desulfurization. In second distillation reaction zone 21 the organic sulfur compounds (sulfides and thiophenes) react with hydrogen to form $H_2S$ which is taken along with the overheads via flow line 8 and which can be easily separated from the overhead naphtha product by condensation of the naphtha. If necessary an $H_2S$ stripping column may be added for the overhead product. Again a reflux 24 is used for better reaction and separation with raffinate product taken via line 25.

The bottoms is taken via flow line 9 and is substantially reduced in sulfur content as is the overheads and both may used as gasoline blending components. Product is taken via flow line 16 and a reboiler 50 is added for heat balance to the column 20. One of the benefits of the distillation column reactor for hydrodesulfurization is that some isomerization of the heavier olefin compounds occurs which almost makes up for the loss in octane due to monoolefin saturation.

EXAMPLE

A full range FCC naphtha having the characteristics noted above is fed to a three inch diameter distillation column reactor having a supported palladium catalyst in the upper 20 feet as a catalytic distillation structure and 10 feet of supported nickel catalyst below the palladium catalyst, both prepared as distillation structures in the manner disclosed in U.S. patent application Ser. No. 08/500,101 filed Jul. 10, 1995. The column is operated as a depentanizer to take a $C_5$ and lighter stream overhead. The bottoms from first column is fed to a second distillation column reactor which is a three inch diameter column having 30 feet of cobalt/molybdenum catalyst as a distillation structure. The column was operated to take a 350° F. overhead cut and the remainder as bottoms. Conditions and results are shown in TABLE V.

TABLE V

| Run Number<br>Hours on line | 4057C5H2<br>166 | 1027HDS<br>308 |
|---|---|---|
| First Column | | |
| Feed Rate lbs/hr | 347 | |
| Total Sulfur, wppm | 999 | |
| Ethyl mercaptan, wppm | 11 | |
| Overhead, lbs/hr | 39.3 | |
| Total Sulfur, wppm | 40 | |
| Mercaptans, wppm | 0 | |
| Bottoms, lbs/hr | 307.7 | |
| Total Sulfur, wppm | 1150 | |
| Catalyst temperature, °F. | | |
| Top | 260 | |
| Bottom | 280 | |
| Pressure, psig | 100 | |
| Hydrogen, SCFH | 19 | |
| $H_2$ partial press, psig | 3.8 | |
| Second Column | | |
| Feed Rate lbs/hr | 20 | |

TABLE V-continued

| Run Number<br>Hours on line | 4057C5H2<br>166 | 1027HDS<br>308 |
|---|---|---|
| Total Sulfur, wppm | | 1300 |
| Overhead, lbs/hr | | 16 |
| Total Sulfur, wppm | 122 | |
| Bottoms, lbs/hr | | 4 |
| Total Sulfur, wppm | | 35 |
| Catalyst temperature, °F. | | |
| Top | | 552 |
| Bottom | | 696 |
| Pressure, psig | | 200 |
| Hydrogen, SCFH | | 120 |
| $H_2$ partial press, psig | | 75.5 |
| Sulfur conversion, | | 92 |

The invention claimed is:

1. A process for removing sulfur from a naphtha boiling range hydrocarbon stream, comprising the steps of:
   (a) feeding a naphtha boiling range hydrocarbon stream containing olefins, diolefins, mercaptans and thiophenes and an effectuating amount of hydrogen to a first distillation column reactor into a feed zone;
   (b) boiling a fraction of said naphtha boiling range hydrocarbon stream containing mercaptans, diolefins and a substantial portion of said olefins upward into a first distillation reaction zone containing a Group VIII metal hydrogenation catalyst suitably supported and spaced in said first distillation column to act as a catalytic distillation structure under conditions to react a portion of said mercaptans with a portion of the diolefins to form sulfides and an overhead distillate product having a reduced mercaptan content;
   (c) removing said sulfides, thiophenes and heavier mercaptans with a higher boiling fraction as bottoms from said first distillation column reactor;
   (d) feeding said bottoms and hydrogen to a second distillation column reactor having a second distillation reaction zone containing a hydrodesulfurization catalyst suitably supported and spaced in said second distillation column to act as a catalytic distillation structure under conditions to react a portion of said sulfides, thiophenes and heavier mercaptans with said hydrogen to form $H_2S$;
   (e) removing said $H_2S$ as a gas from the overheads from said second distillation column reactor; and
   (f) recovering a naphtha product from said second distillation column reactor.

2. The process according to claim 1 wherein said first distillation column reactor is a depentanizer and said overheads contain a $C_5$ and lighter fraction.

3. The process according to claim 1 wherein said first distillation column reactor is a dehexanizer and said overheads contain a $C_6$ and lighter fraction.

4. The process according to claim 1 wherein all of the liquid product from both distillation column reactors is combined for a gasoline blending component.

5. The process according to claim 1 wherein a first portion of the olefins contained within said bottoms is hydrogenated to alkanes and a second portion of the olefins contained within said bottoms is isomerized to produce a naphtha product from said second distillation column reactor having only a slightly reduced octane number.

6. The process according to claim 1 wherein said hydrodesulfurization catalyst comprises two metal oxides supported on an alumina base, said metal oxides selected from the group consisting of molybdenum, cobalt, nickel, tungsten and mixtures thereof.

7. The process according to claim 1 wherein the total pressure in said first distillation column reactor is in the range of 0 to 250 psig and the total pressure in said second distillation column reactor is in the range of 25 to less than 300 psig.

8. The process according to claim 7 wherein the hydrogen partial pressure in said second distillation column reactor is between 0.1 and 150 psi.

9. The process according to claim 1 wherein the temperature within said first distillation reaction zone is in the range of 230° F. to 270° F. and the temperature within said second distillation reaction zone is in the range of 400 ° F. to 750 ° F.

10. The process according to claim 1 further comprising removing an overhead stream from said second distillation column reactor and stripping the $H_2S$ from said overhead stream.

11. The process according to claim 1 wherein the hydrogen flow rate to said second distillation column reactor is in the range of one to ten standard cubic feet per pound of feed to said second distillation column reactor.

12. The process according to claim 1 wherein said first supported catalyst comprises palladium oxide.

13. The process according to claim 1 wherein said first supported catalyst comprises nickel sulfide.

* * * * *